(12) United States Patent
McGraw et al.

(10) Patent No.: US 9,212,488 B1
(45) Date of Patent: Dec. 15, 2015

(54) SHEET ROOFING WITH PRE-TAPED SEAMS AND TAPE THEREFOR

(71) Applicant: JOHNS MANVILLE, Denver, CO (US)

(72) Inventors: Ethan Nelson McGraw, Holland, MI (US); Troy Furgal, New Lenox, IL (US); Todd Nathan, Denver, CO (US); Eric Alden Olson, Thornton, CO (US); Zebonie Sukle, Denver, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 14/557,053

(22) Filed: Dec. 1, 2014

(51) Int. Cl.
*E04D 5/14* (2006.01)

(52) U.S. Cl.
CPC ............... *E04D 5/142* (2013.01); *E04D 5/148* (2013.01)

(58) Field of Classification Search
CPC ............... E04D 5/02; E04D 5/04; E04D 5/06; E04D 5/08; E04D 5/141; E04D 5/148; E04D 43/38; E04D 1/36; E04D 1/365; E04D 12/002; E04B 1/70; E04B 1/66; E04F 15/181; E04F 15/187; E04F 13/042
USPC ...................... 52/408, 409, 411, 412, DIG. 16
See application file for complete search history.

(56) References Cited

U.S. PATENT DOCUMENTS

| | | | | |
|---|---|---|---|---|
| 2,241,058 A | * | 5/1941 | Eason | 52/545 |
| 2,367,725 A | * | 1/1945 | Phillips, Jr. et al. | 156/308.8 |
| 4,601,935 A | * | 7/1986 | Metcalf et al. | 428/57 |
| 4,849,268 A | * | 7/1989 | Backenstow et al. | 428/57 |
| 4,855,172 A | * | 8/1989 | Chiu | 428/57 |
| 4,910,059 A | * | 3/1990 | Sancaktar | 428/47 |
| 5,093,171 A | * | 3/1992 | Sheahan | 428/61 |
| 5,260,111 A | * | 11/1993 | Valaitis et al. | 428/57 |
| 5,520,761 A | * | 5/1996 | Kalwara et al. | 156/157 |
| 5,563,217 A | * | 10/1996 | Davis et al. | 525/194 |
| 5,859,114 A | * | 1/1999 | Davis et al. | 524/490 |
| 6,506,466 B1 | * | 1/2003 | Sieber et al. | 428/40.1 |
| 6,962,738 B2 | * | 11/2005 | Swann | 428/40.1 |
| 7,441,381 B2 | * | 10/2008 | Scheirer et al. | 52/409 |
| 2004/0154265 A1 | * | 8/2004 | Knowlton | 52/741.1 |
| 2004/0172908 A1 | * | 9/2004 | Swann | 52/518 |
| 2004/0238097 A1 | * | 12/2004 | Swann | 156/71 |
| 2005/0126103 A1 | * | 6/2005 | Scheirer et al. | 52/518 |
| 2005/0170125 A1 | * | 8/2005 | Naipawer et al. | 428/41.7 |
| 2005/0235591 A1 | * | 10/2005 | Martin | 52/409 |
| 2006/0096218 A1 | * | 5/2006 | Johnson | 52/506.01 |
| 2007/0251162 A1 | * | 11/2007 | Schmid | 52/95 |
| 2009/0087633 A1 | * | 4/2009 | Furgal et al. | 428/213 |
| 2010/0200148 A1 | * | 8/2010 | Douglas | 156/71 |

* cited by examiner

*Primary Examiner* — Joshua J Michener
*Assistant Examiner* — Kyle Walraed-Sullivan
(74) *Attorney, Agent, or Firm* — Robert D. Touslee

(57) ABSTRACT

According to one aspect, a roof membrane is provided. The roofing membrane includes a main body, a first adhesive material, and a second adhesive material. The first adhesive material is bonded to a top surface of the main body and positioned toward a first edge thereof. The second adhesive material is bonded to the top surface of the main body and positioned toward a second edge thereof. The second edge is positioned opposite the first edge such that the first and second adhesive materials are positioned toward opposite edges of the main body and the same surface thereof.

12 Claims, 6 Drawing Sheets

SHEET ROOFING WITH PRE-TAPED SEAMS AND TAPE THEREFOR

BACKGROUND OF THE INVENTION

Roofing membranes are commonly used for roofing systems of building and structures. Roofing membranes are often applied to the building or structure's roof to prevent leaks and/or to provide aesthetic appeal. Roofing membranes are commonly made of various synthetic rubber materials, modified bitumen, or thermoplastic materials.

Two common types of roofing membrane include those made of thermoplastic polyolefin (TPO) and those made of ethylene propylene diene monomer rubber (EPDM). TPO membranes are often white, but may be made in various other colors or shades, such as grey, black, and the like. Similarly, EPDM membranes are often black, but in some embodiments may also be white. White roofing membranes are often used to provide a pleasing visual appeal and/or to reflect radiation and thereby minimize heat island effects. Individual sections of EPDM membranes are often bonded together by priming or preparing an edges of the EPDM membranes and then applying a tape to the primed or prepared edges. Individual sections of TPO membranes are often coupled together by overlapping adjacent edges and heat welding the edges together. TPO may also be bonded by priming adjacent edges and using a tape.

BRIEF SUMMARY OF THE INVENTION

According to one aspect, a roofing membrane comprises a main body having a first surface, a second surface positioned opposite the first surface, and four edges that define an outer periphery of the main body such that the main body has a rectangular or square profile. The roofing membrane further comprises a first adhesive material bonded to the first surface of the main body and positioned toward a first edge thereof. The first adhesive material extends along a majority of a length of the first edge. The roofing material further comprises a second adhesive material bonded to the first surface of the main body and positioned toward a second edge thereof, the second adhesive material extending along a majority of a length of the second edge. The second edge is positioned opposite the first edge such that the first and second adhesive materials are positioned toward opposite edges of the main body on the same surface thereof.

According to another aspect, a roof membrane system comprises a first membrane positioned atop the roof, the first membrane having an edge, wherein the first membrane does not include any pre-applied adhesive material. The roof membrane system further comprises a second membrane positioned atop the roof, the second membrane having a first edge and a second edge opposite the first edge. The first edge of the second membrane is overlapped with the edge of the first membrane, and the first edge of the second membrane includes a first adhesive material on a surface thereof, the first adhesive material extending along a majority of the length of the first edge of the second membrane and adhering to the edge of the first membrane. The second edge of the second membrane includes a second adhesive material on the same or an opposing surface of the second membrane, the second adhesive material extending along a majority of the length of the second edge of the second membrane. The roof membrane system further comprises a third membrane positioned atop the roof, the third membrane having an edge, wherein the third membrane dos not include any pre-applied adhesive material. The edge of the third membrane is overlapped with the second edge of the second membrane and is adhered to the second adhesive material.

According to another aspect, a roofing material package comprises a first plurality of first membranes, each first membrane comprising a sheet of material rolled into a generally cylindrical roll. Each first membrane does not include any pre-applied adhesive material. The roofing material package further comprises a second plurality of second membranes, each second membrane comprising a sheet of material rolled into a generally cylindrical roll. Each second membrane includes a first surface and a second surface opposite the first surface, and a first edge and a second edge opposite the first edge. Each second membrane further includes a first adhesive material bonded to the first surface and positioned toward a first edge thereof, the first adhesive material extending along a majority of a length of the first edge. Each second membrane also includes a second adhesive material bonded to the first or second surface of the respective second membrane and positioned toward a second edge thereof, the second adhesive material extending along a majority of a length of the second edge. The first plurality of first membranes and the second plurality of second membranes are packaged for shipment together.

According to another aspect, a method of manufacturing a pre-taped roofing membrane comprises providing a main body of the roofing membrane, the main body having a first surface, a second surface positioned opposite the first surface, and four edges that define an outer periphery of the main body such that the main body has a rectangular or square profile. The method further comprises providing an adhesive material in the form of a partially-cured butyl tape, and bonding the adhesive material to the first surface of the main body and positioned toward a first edge thereof, the first adhesive material extending along a majority of a length of the first edge.

BRIEF DESCRIPTION OF THE DRAWINGS

The present invention is described in conjunction with the appended figures.

Figure 1:
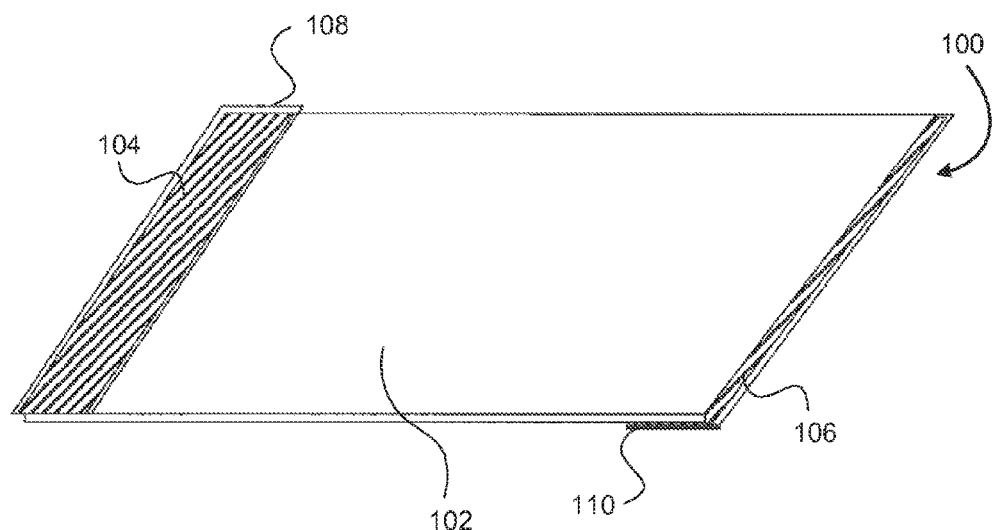
FIG. 1 illustrates a perspective view of an embodiment of a roofing membrane having multiple adhesive regions.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

The embodiments described herein provide roofing membranes that may be easily installed atop a roof. Installation of the roofing membranes is simplified by the incorporation of adhesive material and/or tape layers on opposing ends or edges of the roofing membrane. In some embodiments, adhesive material and/or tape layer is positioned on opposing edges of the same surface of the roofing membrane in order to allow the edges of adjacent membranes to be overlapped and coupled or bonded together. For convenience in describing the embodiments herein, the adhesive material and/or tape will be generally described as an adhesive material or adhesive layer. It should be realized, however, that the description of the adhesive material or layer may encompass a variety of adhesives and/or tape layers. In some embodiments, the tapes and/or adhesive materials may be of the same material composition or could be formed of various compositions including but not limited to reactive chemistries, pressure sensitive systems, and the like.

A releasable tape or liner may be releasably coupled to each of the adhesive materials to limit environmental exposure of the adhesive material and thereby maintain the adhesive properties of the material. The releasable liner of adjacent membranes may be easily removed at the job site prior to coupling of the membranes. The use of the releasable liner may eliminate, or greatly reduce, the need for priming or preparation of the roofing membranes prior to coupling of the membranes. For example, in some embodiments an installer does not need to apply a solvent or solution to the roofing membrane in order to remove debris, oils, or other contamination that may impede or alter the coupling or bonding of adjacent roofing membranes. The elimination or reduction of this installation step greatly decreases the time in which a roof membrane system may be installed.

As used herein, the term roofing membrane means essentially any material that is installed atop a roof, typically as an outer surface or layer. Such roofing membranes are commonly installed for various functional and/or aesthetic purposes. For example, roofing membranes may be installed to provide weather proofing, reduce urban heat island effects via heat reflection, reduce UV damage, reduce roof maintenance and/or degradation, improving weathering characteristics, and the like. Roofing membranes may also provide a sleek and/or desired roof appearance, such as a uniform roof color and/or style.

Common roofing membranes include various thermoset materials, such as ethylene propylene diene monomer rubber (EPDM), and various thermoplastic materials, such as Thermoplastic PolyOlefin (TPO). The embodiments described herein may find particular usefulness for roofing membranes constructed or EPDM and/or TPO materials, although the embodiments may be used for other thermoset and/or thermoplastic roofing membranes as desired.

Roofing systems often include various materials and/or layers in addition to the roofing membranes. These layers/materials are typically positioned under the roofing membrane and may include support members (e.g., wood and/or metal beams), insulation layers (e.g., foam and/or other insulating boards), and/or other boards or members. The roofing membrane may be coupled with one or more of these materials via ballasting, mechanically fastening, adhesive bonding, heat welding, and the like.

Conventional roofing membranes are typically coupled together by overlapping adjacent edges, preparing or priming one or more edges, and then using an adhesive material to bond the adjacent edges or heat welding the adjacent edges together. In priming or preparing the edges, the installer must wait for the primer material to flash before applying the adhesive. Improper application of the primer and/or adhesive may result in an improper bond, which may create immediate and/or long term roofing problems, such as leakage. Human error, such as non-uniform application of the primer and/or adhesive material, may also result in inadequate or insufficient membrane adhesion, which may create short term and/or long term problems. These and other issues may be reduced or eliminated via the roofing membrane embodiments described herein.

Referring now to FIG. 1, illustrated is an embodiment of a roofing membrane 100 that may be constructed of a thermoset material (e.g., EPDM) or a thermoplastic material (e.g., TPO). Roofing membrane 100 includes a main body 102 having a top surface and a bottom surface positioned opposite the top surface. Main body 102 also includes four edges that define an outer periphery of main body 102. Main body 102 typically has a square or rectangular profile. In many instances, main body 102 may have a lateral width of between about 10 and 40 feet, a longitudinal length of between about 50 and 100 feet, and a thickness of between about 0.045 and 0.090 inches, although it should be realized that these dimensions may vary depending on the application and/or need.

A first adhesive material or tape is bonded to, coupled to, or otherwise positioned atop the top surface of the main body 102. The first adhesive material or tape is positioned toward a first edge of the main body 102 and forms an adhesive material strip 104 or layer (hereinafter adhesive strip 104) atop the top surface of main body 102. The adhesive strip 104 extends along a majority of the first edge's length, and commonly along the entire length between opposing ends. The description of the adhesive strip 104 extending along the entire length of the first edge between opposing ends includes situations where the strip 104 is slightly shorter than the length of the first edge. For example, in some embodiments, the strip 104 may be coupled or bonded to the main body 102 between 3 and 6 inches short of an edge of the main body. In such embodiments, the last 3 to 6 inches on the end laps may be taped or adhered by a contractor or installer. The adhesive strip 104 is commonly between about 3 and 6 inches wide, although in some embodiments the strip 104 may be between ½ and 8 inches wide. The adhesive strip 104 may also be between 0.005 and 0.030 inches thick, and may be positioned with respect to main body 102 so that an edge of the adhesive strip 104 is aligned with, or offset from, the first edge as described in greater detail herein below. In other embodiments, adhesive strip 104 may have a width greater than 6 inches or less than 3 inches as desired.

A second adhesive material or tape is bonded to, coupled to, or otherwise positioned atop the bottom surface of main body 102. The second adhesive material or tape is positioned toward a second edge of the main body 102 and forms an adhesive material strip 106 or layer (hereinafter adhesive strip 106) atop the bottom surface of main body 102. Like adhesive strip 104, adhesive strip 106 extends along a majority of the second edge's length, and commonly along the entire length between opposing ends. Adhesive strip 106 commonly has a width of between 3 and 6 inches, although other widths may be employed. Adhesive strip 106 may also be aligned with or offset from the second edge of main body 102 as desired.

The second edge is positioned on an opposite side of main body 102 from the first edge so that opposing edges or ends of the main body 102 include the adhesive strips, 104 and 106. Further, the adhesive strips, 104 and 106, are positioned on opposing surfaces of the main body 102 to aid in coupling of adjacent roofing membranes 100 as described herein below. A releasable liner or tape is normally coupled with a top surface of the adhesive strips to prevent or limit environmental exposure of the adhesive material, which may degrade the adhesive material or otherwise compromise or interfere with bonding of the adhesive material. The releasable liner may also prevent premature drying or hardening of the adhesive material. The releasable liner may be constructed of a polymer or other material membrane, such as coated paper, metalized film, coated fabric, and the like, that releasably adheres to the adhesive material.

As shown in FIG. 1, a first liner or membrane 108 may be releasably coupled with adhesive strip 104 and a second liner or membrane 110 may be releasably coupled with adhesive strip 106. The liners, 108 and 110, may be sized slightly larger than the respective adhesive strips, 104 and 106, to allow the liners to fully cover and conceal the adhesive material. The slightly larger liners, 108 and 110, also make it easier for an installer to grasp an edge of the liner and remove the liner from the respective adhesive strips, 104 and 106, prior to or during installation of the roofing membrane 100.

The use of the adhesive strips, 104 and 106, on roofing membrane 100 decreases the amount of time required to install the membrane 100 onsite. For example, the adhesive strips, 104 and 106, eliminate the need for a contractor or installer to prime or prepare edges of the roofing membrane 100 in order to bond the roofing membrane 100 with an adjacent membrane. As such, an installer does not need to wait for the primer to flash, thereby decreasing the installer's wait time and allowing the installer to move on to the next stage of installation. Further, the adhesive strips, 104 and 106, may be bonded to the respective surfaces of main body 102 as part of the manufacturing process of the roofing membrane 100. Accordingly, the manufacturer has increased control over the bonding element or layer that is ultimately used in forming the roofing system, thereby eliminating or reducing human error and/or increasing the likelihood that the bonding element or layer is properly prepared. This may result in improved bonding between adjacent roofing membranes thereby minimizing or eliminating some or all of the short-term and long-term issues described above.

Figure 2:
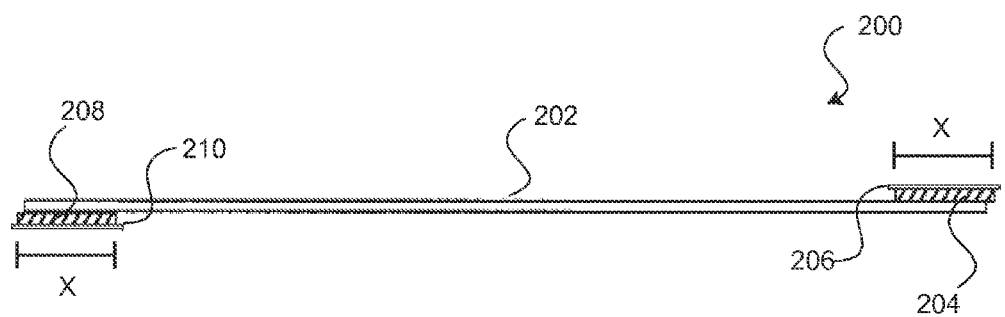
FIG. 2 illustrates a side view of an embodiment of a roofing membrane having multiple adhesive regions.

Referring now to FIG. 2, illustrated is another embodiment of a roofing membrane 200. Roofing membrane 200 is similar to membrane 100 in that membrane 200 has a main body 202 that includes a first adhesive strip 204 positioned on one side of the main body 202 and a second adhesive strip 208 positioned on an opposite side of the main body 202. As described above, the adhesive strips, 204 and 208, are positioned on opposing surfaces of main body 202. A releasable tape or liner 206 is releasably coupled atop the first adhesive strip 204 while a releasable tape or liner 210 is releasably coupled atop the second adhesive strip 208. FIG. 2 illustrates that the adhesive strips, 204 and 208, may be applied so as to have a relatively equal thickness and width on the opposing sides and surfaces of main body 202.

Employing relatively equal thickness and width adhesive strips, 204 and 208, may eliminate or reduce common problems associated with rolling up the membrane 200 for transportation and/or storage. For example, if membrane 200 includes only one adhesive strip material (i.e., 204 or 210), as the membrane 200 is rolled about a core, the single adhesive strip may cause the thickness of the roll to increase disproportionately on one side of the core, thereby varying the thickness of the roll product across the web of the roll. A varying thickness of the roll product may cause the roll product to telescope about the core during wind up and/or cause the membrane 200 to curve or bend as it is being unrolled atop a roof. In contrast, by applying the adhesive strips, 204 and 208, to opposing ends and/or surfaces of main body 202, the resulting roll product has a relatively equal thickness about the core, which aids in preventing telescoping during wind up and/or aids in keeping the membrane 200 straight as it is rolled out atop a roof.

Figure 3:
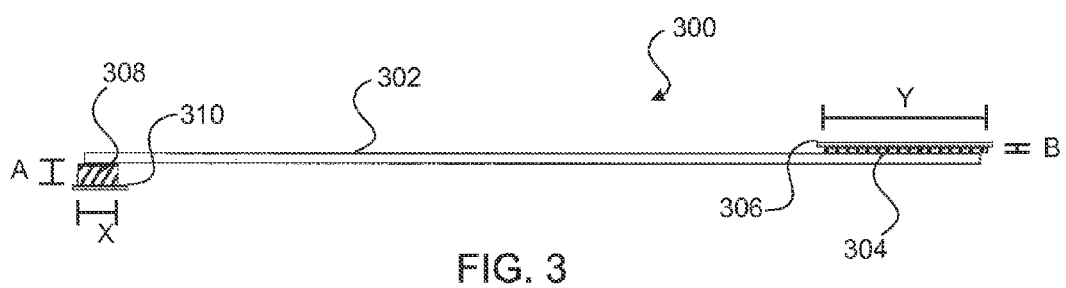
FIG. 3 illustrates a side view of another embodiment of a roofing membrane having multiple adhesive regions.

Referring now to FIG. 3, illustrated is another embodiment of a roofing membrane 300 having a main body 302 with an adhesive strip 304 positioned on one side of the main body 302 and another adhesive strip 308 positioned on an opposite side and opposite surface of the main body 302 as described above. Releasable liners, 306 and 310, are releasably coupled with a top surface of the respective adhesive strips, 304 and 308. The adhesive strips, 304 and 308, are different from those previously described in that the strips having varying widths and/or thicknesses. For example, adhesive strip 304 has a width of Y and a thickness of B while adhesive strip 308 has a width of X and a thickness of A. The widths and/or thicknesses of the respective adhesive strips, 304 and 308, may be within the ranges previously described. In some embodiments, the widths, Y and X, of the adhesive strips, 304 and 308 respectively, may vary, while in other embodiments the thicknesses, B and A, of the adhesive strips, 304 and 308 respectively, may vary. In some embodiments, both the widths and the thicknesses of the adhesive strips, 304 and 308, may vary.

Varying the widths and/or thicknesses of the adhesive strips, 304 and 308, may aid in coupling of adjacent roofing membranes and/or forming a roofing membrane system about a uniquely shaped roof. For example, wider and/or thinner adhesive strips (e.g., adhesive strip 304) may be used when a greater bonding surface area is desired while narrower and/or thicker adhesive strips (e.g., adhesive strips 308) may be used when an edge of the roofing membrane 300 is butted up against a corner of the roof. In some embodiments, the roofing system formed atop a roof may include a combination of roofing membranes having relatively equal sized adhesive strips and roofing membranes having relatively unequal sized adhesive strips as needed.

Figure 4:
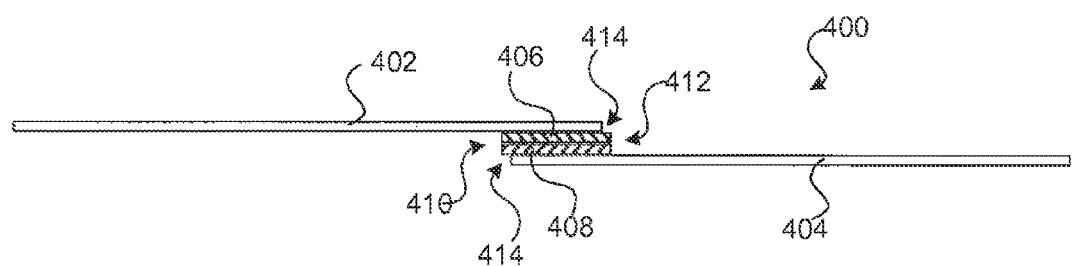
FIG. 4 illustrates a side view of an embodiment of a first roofing membrane and a second roofing membrane coupled together as part of a roofing system.
Figure 5:
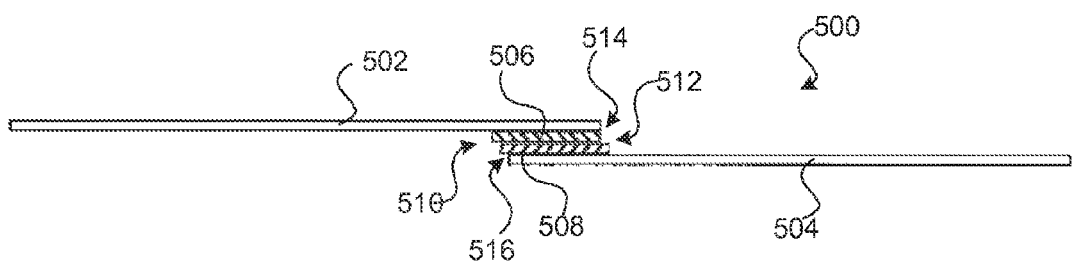
FIG. 5 illustrates a side view of another embodiment of a first roofing membrane and a second roofing membrane coupled together as part of a roofing system.

Referring now to FIGS. 4-5, illustrated are embodiments in which adjacent roofing membranes are coupled or bonded together to form a roofing system. For example, FIG. 4 illustrates a roofing system 400 formed of a bonded or coupled first roofing membrane 402 and second roofing membrane 404. The first and second roofing membranes, 402 and 404, may be constructed similarly to those described herein above having a main body with opposing ends and surfaces having an adhesive strip. In coupling or bonding the adjacent membranes, 402 and 404, a distal edge of membrane 402 is overlapped with a proximal edge of membrane 404 so that the adhesive materials, 406 and 408, of the respective membranes are vertically aligned. The releasable liners (not shown) of the adhesive materials, 406 and 408, may then be removed and the adhesive materials pressed together to couple or bond the membranes, 402 and 404, together. The adhesive strips, 406 and 408, bond well together eliminating the need to prime any membrane surface for bonding strength.

As shown in FIG. 4, the adhesive strips, 406 and 408, may be aligned relative to one another so that a proximal edge 410 and/or a distal edge 412 of each adhesive strip, 406 and 408, is aligned. Stated differently, the proximal edge 410 and/or distal edge 412 of the coupled strips, 406 and 408, may be relatively flush after the membranes, 402 and 404, are coupled together. Similarly, adhesive strip 406 and/or adhesive strip 408 may be offset 414 from the edge of the respective membrane, 402 and 404. In some embodiments, the adhesive strip or strips may be offset 414 from the respective membrane by between about ¹⁄₁₆ and ¼ of an inch, and more commonly by about ⅛ of an inch.

Offsetting the adhesive strips from the respective membranes in this manner may allow a contractor or installer to quickly and easily visually inspect the adhesive bond between the membranes, 402 and 404, and/or to determine that the coupled membranes provide a sufficient waterproofing layer. For example, after installation of the roofing system, a contractor or installer may quickly and easily traverse the roofing membranes' seams and inspect the bond between the coupled membranes by inspecting the portion of the adhesive strips that protrude from the seams. The contractor or installer may determine if any gaps or other irregularities exist in the coupled adhesive layers and/or between the adhesive layer and the respective membrane. The contractor or installer may also visually determine whether the coupled membranes are sufficiently waterproof by inspecting the protruding adhesive strips for gaps, cracks, separations, or any other defects that may signal an incomplete or otherwise improper bond between the adjacent membranes and/or adhesive layers that may result in water leakage or other potential problems.

The protrusion of the adhesive strips, 406 and 408, from the seam of the coupled membranes, 402 and 404, may also improve the waterproofing characteristics of the membrane system. For example, the protruding adhesive strip material may minimize or eliminate gaps that may otherwise be formed under the coupled membranes' seam within which water and/or ice may penetrate and cause leakage or other problems. In this manner, the protruding adhesive strip material may function similar to caulking to effectively seal the seams and may eliminate the need for a separate caulking step to be performed.

FIG. 5 illustrates another embodiment of a roofing system 500 having a first roofing membrane 502 bonded or coupled with a second roofing membrane 504. Similar to roofing system 400, the membranes, 502 and 504, of system 500 are bonded by aligning and pressing together respective adhesive strips, 506 and 508. Unlike system 400, however, the adhesive strip 506 of membrane 502 is aligned with membrane 502's distal edge 514 while the adhesive strip 508 of membrane 504 is offset from membrane 504's proximal edge 516. The difference in alignment of the adhesive strips, 506 and 508, results in an offset or staggered alignment of the coupled adhesive strips proximal edge 510 and/or distal edge 512. This staggered relationship of the adhesive strips may aid in the visual inspection of the coupled membranes by visually delineating the bonding interface between the adhesive strips, 502 and 504. The staggered relationship of the adhesive strips may also minimize or eliminate formation of folds or defects during installation, which may improve the waterproofing ability of the system 500. For example, the tape (e.g., butyl tape) is typically soft and easily deforms. In contrast, cured EPDM membranes typically have some stiffness and body so that they will not fold or crease as easily as the tape. As such, the cured EPDM membrane holds the tape in place, thus decreasing the chance for defects to form in the tape.

In any event, one of the adhesive strips should protrude from the seam of coupled membranes, 502 and 504, by between about ¹⁄₁₆ and ¼ inch, and more commonly by about ⅛ inch to provide the visual inspection and/or waterproofing benefits previously described. Preferably the bottom or lower adhesive strip (i.e., adhesive strip 508 in FIG. 5) protrudes from the seam to prevent formation of gaps within which water or ice may penetrate.

Figure 6:
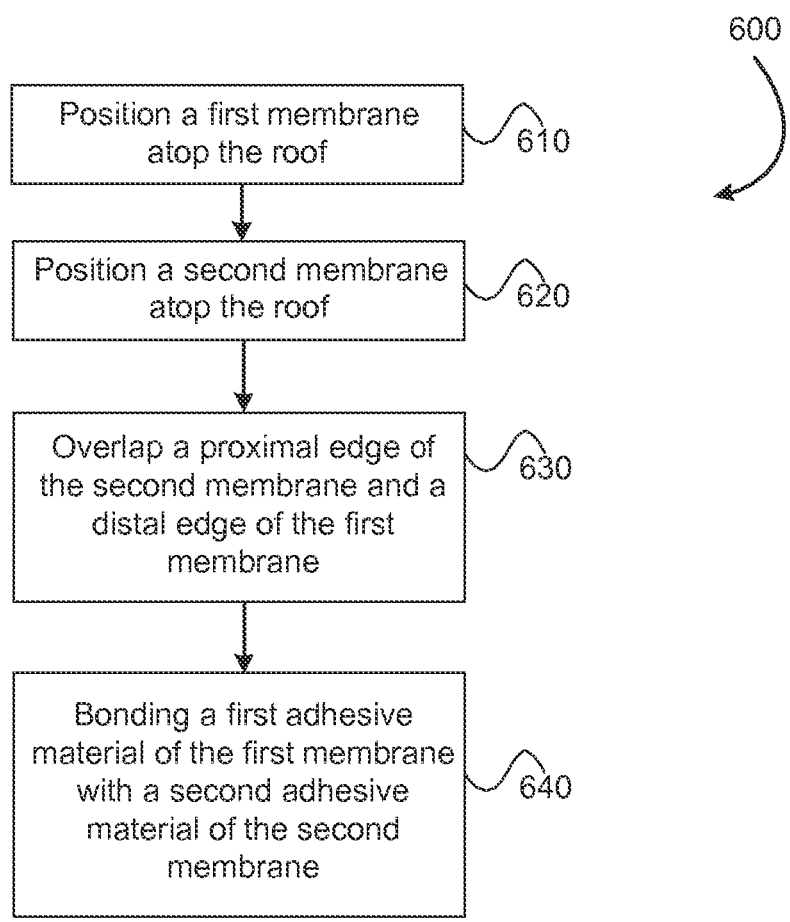
FIG. 6 illustrates a method of coupling roofing membranes atop a roof as part of a roofing system.

Referring now to FIG. 6, illustrated is a method 600 of coupling roofing membranes atop a roof. The roofing membranes may be similar to any of those described herein. At step 610, a first membrane is positioned atop the roof and at step 620, a second membrane is positioned atop the roof. At step 630, a proximal edge of the second membrane is overlapped with a distal edge of the first membrane. As described herein, the distal edge of the first membrane includes a first adhesive material on a top surface thereof that extends along a majority of a length of the distal edge and the proximal edge of the second membrane includes a second adhesive material on a bottom surface thereof that extends along a majority of a length of the proximal edge. At step 640, the first adhesive material is bonded with the second adhesive material to couple the first and second membranes together atop the roof.

Figure 7:
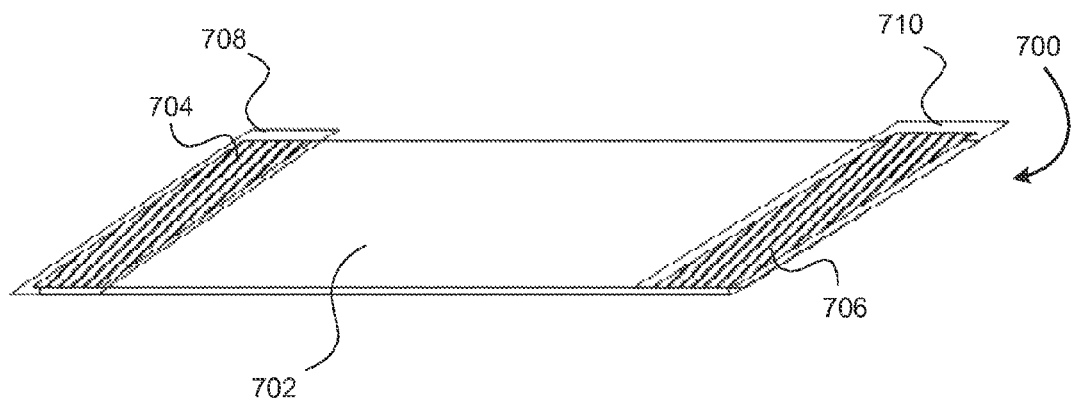
FIG. 7 illustrates a perspective view of another embodiment of a roofing membrane having multiple adhesive regions.

Referring now to FIG. 7, illustrated is an embodiment of a roofing membrane 700. Roofing membrane 700 is similar in some ways to roofing membrane 100 shown in FIG. 1, and may be constructed of a thermoset material (e.g., EPDM) or a thermoplastic material (e.g., TPO). Roofing membrane 700 includes a main body 702 having a top surface and a bottom surface positioned opposite the top surface. Main body 702 also includes four edges that define an outer periphery of main body 702. Main body 702 typically has a square or rectangular profile. In many instances, main body 702 may have a lateral width of between about 10 and 40 feet, a longitudinal length of between about 50 and 100 feet, and a thickness of between about 0.045 and 0.090 inches, although it should be realized that these dimensions may vary depending on the application and/or need.

A first adhesive material or tape is bonded to, coupled to, or otherwise positioned on one surface of the main body 702. The first adhesive material or tape is positioned toward a first edge of the main body 702 and forms and adhesive material strip 704 or layer (hereinafter adhesive strip 704) on the top surface of main body 702. The adhesive strip 704 extends along a majority of the first edge's length, and commonly along the entire length between opposing ends. The description of the adhesive strip 704 extending along the entire length of the first edge between opposing ends includes situations where the strip 704 is slightly shorter than the length of the first edge. For example, in some embodiments, the strip 704 may be coupled or bonded to the main body 702 between 3 and 6 inches short of an edge of the main body. In such embodiments, the last 3 to 6 inches on the end laps may be taped or adhered by a contractor or installer. The adhesive strip 704 is commonly between about 3 and 6 inches wide, although in some embodiments the strip 704 may be between ½ and 8 inches wide. The adhesive strip 704 may also be between 0.005 and 0.030 inches thick, and may be positioned with respect to main body 702 so that an edge of the adhesive strip 704 is aligned with, or offset from, the first edge as described in greater detail herein below. In other embodiments, adhesive strip 704 may have a width greater than 6 inches or less than 3 inches as desired.

Unlike roofing membrane 100 shown in FIG. 1, a second adhesive material or tape is bonded to, coupled to, or otherwise positioned on the same surface of main body 702 as the first adhesive material. The second adhesive material or tape is positioned toward a second edge of the main body 702 and forms an adhesive material strip 706 or layer (hereinafter adhesive strip 706) on the surface of main body 702. Like adhesive strip 704, adhesive strip 706 extends along a majority of the second edge's length, and commonly along the entire length between opposing ends. Adhesive strip 706 commonly has a width of between 3 and 6 inches, although other widths may be employed. Adhesive strip 706 may also be aligned with or offset from the second edge of main body 702 as desired.

The second edge is positioned on an opposite side of main body 702 from the first edge so that opposing edges or ends of the main body 702 include the adhesive strips, 704 and 706. Further, the adhesive strips, 704 and 706, are positioned the same surface of the main body 702 to aid in coupling of adjacent roofing membranes as described herein below. A releasable liner or tape is normally coupled with a top surface of the adhesive strips to prevent or limit environmental exposure of the adhesive material, which may degrade the adhesive material or otherwise compromise or interfere with bonding of the adhesive material. The releasable liner may also prevent premature drying or hardening of the adhesive material. The releasable liner may be constructed of a polymer or other material membrane, such as coated paper, metalized film, coated fabric, and the like, that releasably adheres to the adhesive material.

As shown in FIG. 7, a first liner or membrane 708 may be releasably coupled with adhesive strip 704 and a second liner or membrane 710 may be releasably coupled with adhesive strip 706. The liners, 708 and 710, may be sized slightly larger than the respective adhesive strips, 704 and 706, to allow the liners to fully cover and conceal the adhesive material. The slightly larger liners, 708 and 710, also make it easier for an installer to grasp an edge of the liner and remove the liner from the respective adhesive strips, 704 and 706, prior to or during installation of the roofing membrane 700.

The use of the adhesive strips, 704 and 706, on the same side of roofing membrane 700 may improve the cost effectiveness of a roofing project. Because roofing membrane 700 includes pre-applied adhesive strips 704 and 706, roofing membrane 700 may be more expensive to produce than a traditional roofing membrane that does not include any pre-applied adhesive material. However, the arrangement of the adhesive strips allows the use of a relatively small amount of the relatively more expensive membrane 700, in conjunction with traditional (and likely less expensive) membranes that do not include any pre-applied adhesive material.

Figure 8:
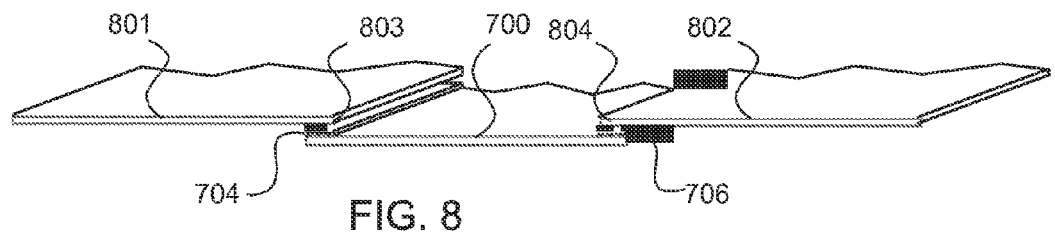
FIG. 8 illustrates a perspective view of another embodiment of a roofing membrane having multiple adhesive regions.

FIG. 8 shows such an arrangement, with roofing membrane 700 positioned between two traditional membranes 801 and 802. Edges 803 and 804 of traditional membranes 801 and 802 can be adhered to respectively to adhesive strips 704 and 706 of roofing membrane 700. For example, edges 803 and 804 may be primed, release liners 708 and 710 removed, and then edges 803 and 804 contacted with adhesive strips 704 and 706 in the traditional manner.

In the example of FIG. 8, only one of the three membranes need have pre-applied adhesive material, so that two of the three membranes can be less expensive membranes having no pre-applied adhesive. Depending on the widths of roofing membrane 700 and traditional membranes with which it is used, only a small portion of the roof area may be covered with membranes having pre-applied adhesive, and therefore most of the roof may be covered with lower cost traditional membranes lacking any pre-applied adhesive.

Figure 9:
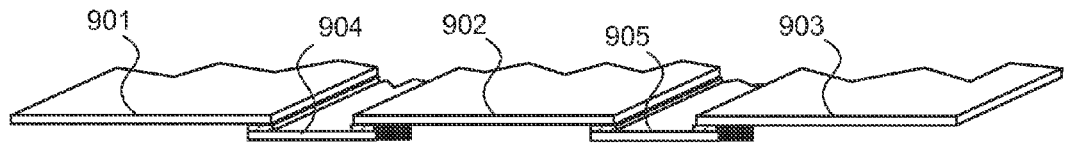
FIG. 9 illustrates a wide roof having traditional membranes alternating with membranes having pre-applied adhesive strips, in accordance with embodiments of the invention.

For example, FIG. 9 illustrates a wide roof having three traditional membranes 901, 902, and 903 alternating with two membranes 904 and 905 having pre-applied adhesive strips, in accordance with embodiments of the invention. Because membranes 904 and 905 are narrower than traditional membranes 901, 902, and 903, only a small percentage of the roof is covered with the relatively more expensive membranes 904 and 905.

Figure 10:
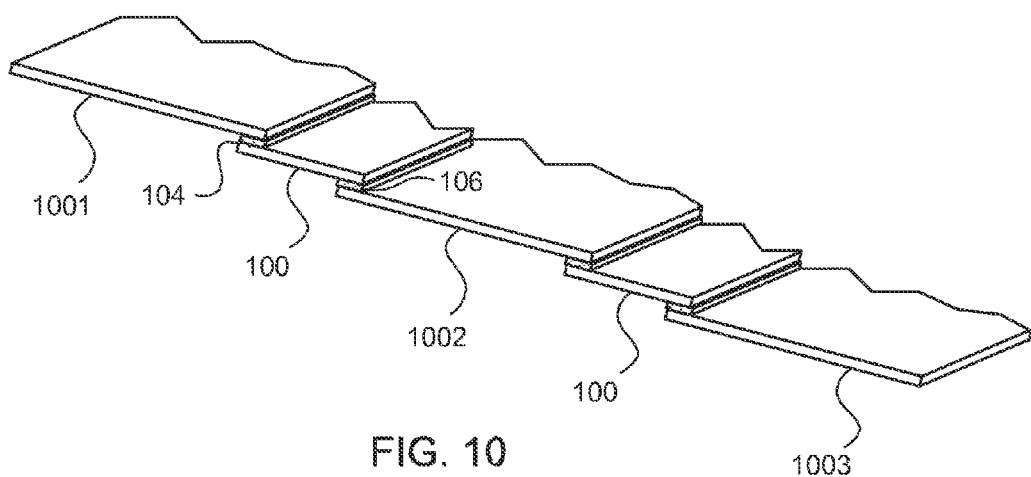
FIG. 10 shows roofing materials applied to a sloped roof, in accordance with embodiments of the invention.

This pattern of membranes having pre-applied adhesive strips alternating with membranes lacking any pre-applied adhesive material may also be used with roofing membranes such as roofing membrane 100 shown in FIG. 1, having the pre-applied adhesive material on opposite sides of the membrane. FIG. 10 shows an edge view of this arrangement as embodied on a sloped roof, but it will be understood that such an arrangement may also be embodied on a flat roof. In FIG. 10, two membranes 100 having pre-applied adhesive strips alternate with three traditional membranes 1001, 1002, 1003 that lack pre-applied adhesive material.

When the size and shape of a particular roof to be covered are known before roofing materials are ordered, the installation may be planned and appropriate amounts of each type of membrane may be ordered and shipped. For example, an area 64 by 95 feet may be conveniently covered by two rolls of traditional membrane (lacking any pre-applied adhesive material) 30 feet wide by 100 feet long and one roll of membrane such as membrane 100 or membrane 700 (having pre-applied adhesive strips on opposite edges) five feet wide by 100 feet long. In some embodiments, the proportions of materials needed for a particular job may be determined before ordering, so that a package of mixed materials tailored to the job may be specifically prepared and packaged for shipment.

Figure 11:
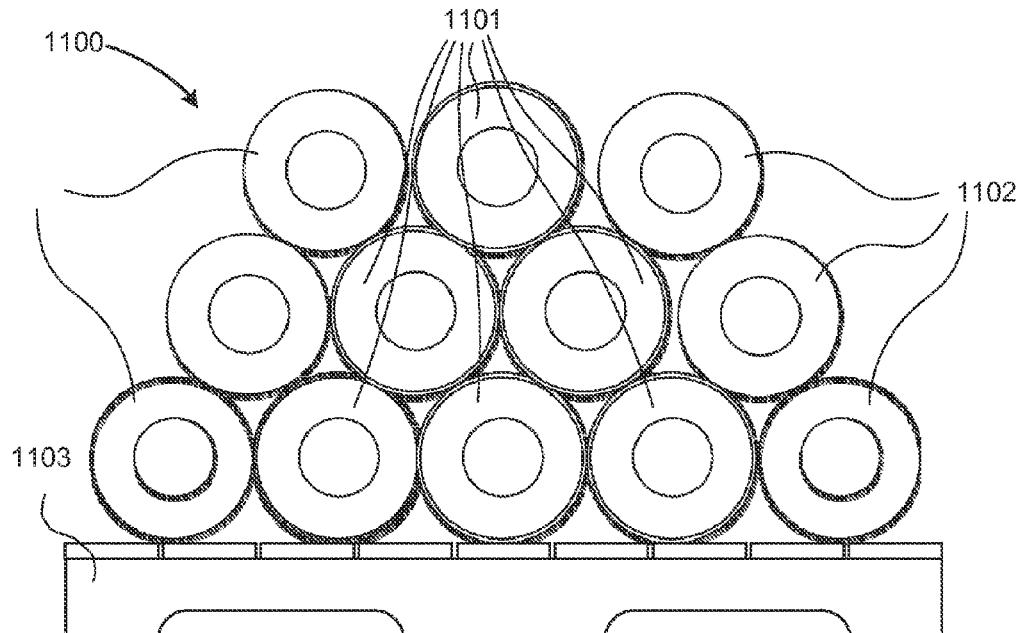
FIG. 11 illustrates such a package of mixed roofing materials, in accordance with embodiments of the invention.

FIG. 11 illustrates such a package 1100 of mixed materials, in accordance with embodiments of the invention. Package 1100 includes six rolls 1101 of roofing membrane having pre-applied adhesive strips, and six rolls 1102 of traditional membrane lacking any pre-applied adhesive strips. Rolls 1101 may include roofing membranes similar to roofing membrane 100 or roofing membrane 700 discussed above, or both. It will be recognized that these proportions may vary according to the parameters of a particular roofing job. A mixed package such as package 1100 may have the additional advantage that there is less risk of loss from damage than if pre-taped rolls 1101 were shipped separately. The traditional un-taped rolls 1102 are less susceptible to shipping damage, and can serve to protect the pre-taped rolls during shipping and handling. In addition to the reduced risk of damage, damage that does occur may be to the less-expensive un-taped rolls 1102 rather than the comparatively expensive pre-taped rolls 1101. FIG. 11 shows one arrangement of rolls on pallet 1103, but it will be recognized that the advantages of such mixed shipping would be obtained with other arrangements as well, including a random mixture of traditional rolls 1102 and pre-taped rolls 1101.

The use of pre-applied adhesive materials as discussed above entails applying the adhesive materials in a factory setting. In other aspects, embodiments of the invention provide improvements in the process of production of roofing membranes having pre-applied adhesive strips.

Previously, two techniques for applying adhesive strips in a factory setting were available.

In a first technique, a fully-cured butyl tape was used and adhered to the underlying membrane, for example an EPDM membrane. Fully-cured butyl tape is typically made by mixing the components of the tape, extruding the mixture into the elongate shape of the tape onto a release liner material, and heat curing the tape. The heat curing accelerates cross-linking of the polymers included in the tape and increases the tensile strength of the tape as compared with the uncured tape. Because the materials of both the tape and the underlying membrane were fully cured rubbers, each had a low surface energy and bonding the two materials together required priming as described above. The bonding process was time-consuming, and involved the use of volatile chemicals, entailing expensive safety measures and record keeping involved in the use of volatile chemicals in a factory setting.

In a second technique, uncured butyl tape was used. Uncured butyl tape is made similarly to fully-cured tape, except that the tape is not heat cured. The uncured tape will self-cure at room temperature over time, but this self curing is very slow, and can require weeks or months. The uncured tape sticks well to a membrane such as an EPDM or TPO membrane, even without the use of a primer or separate adhesive. Thus, this second technique has the advantage that it minimizes the use of volatile chemicals in the production of roofing membranes with pre-applied butyl adhesive strips.

However, while the tape is in its uncured state, the bond to the underlying membrane material is weak. In order for the combined roofing membrane to withstand shipping and handling, it is necessary that the butyl tape be cured after its application to the underlying membrane. There are again two options for curing the butyl tape. First, the combined membrane and tape could be subjected to a heat curing step. However, this requires additional equipment and additional handling of the membrane. In a second option, the butyl tape may be simply allowed to slowly self-cure at ambient conditions in the factory or in other storage. However, this requires maintaining several weeks or months of inventory while the self curing progresses and before the completed product can be shipped. Storage space is required that may be expensive or could be put to other productive uses, and tracking and management of the inventory introduces additional overhead into the manufacturing process.

Embodiments of the invention provide techniques for manufacturing roofing membranes having pre-applied butyl or other adhesive strips. The techniques minimize or eliminate the use of volatile chemicals, and may also reduce the need for long term storage of large volumes of in-process inventory.

According to embodiments of the invention, a partially-cured butyl or similar tape is used. The partially-cured butyl tape is sufficiently tacky that it adheres satisfactorily to the underlying roofing membrane, for example an EPDM or TPO membrane, without the use of a primer or additional adhesive. The partially-cured butyl tape is also sufficiently cured that the resulting pre-taped roofing membrane need not be stored for such extensive periods of time to allow additional curing. Thus, use of volatile chemicals is avoided or eliminated, and the amount of inventory required to be stored during the manufacturing process is reduced.

The partially-cured butyl tape may be made in any suitable way. Experiments have shown that simply aging an uncured tape at about 70° F. for two months to one year produces a partially-cured tape that is satisfactory for use in embodiments of the invention. Alternatively, uncured tape may be subjected to an abbreviated heat curing process. The process is interrupted before full cure is achieved, resulting in a tape that is satisfactory for use in embodiments of the invention, for example a tape that is in a state of cure similar to that achieved by aging an uncured tape for two months to one year.

It will be appreciated that even if the partially-cured tape is produced by simple aging of the tape, only the tape need be stored during the process of aging the tape. Thus the volume of inventory that must be stored is significantly reduced as compared with applying an uncured tape to the underlying membrane and then aging the entire pre-taped roofing membrane. In some embodiments, the pre-taped roofing membrane may be further aged after the butyl tape is applied to the underlying membrane, but it will be recognized that due to the partial curing of the butyl tape before adhesion to the underlying membrane, the amount of time required for storage of the completed roofing membrane may be reduced, and therefore the volume of stored in-process inventory may be reduced, as compared with assembling a pre-taped roofing membrane using an uncured tape.

Once the tape (applied in the partially-cured state without the use of primer) has cured, the bond between the tape and the membrane is as strong or nearly as strong as the bond formed using a primer system to bond fully-cured tape to a membrane. Thus, the long term performance of the pre-taped roofing membrane is not compromised by using partially-cured tape without a primer, as compared with using fully cured tape and a primer to make the pre-taped roofing membrane.

Figure 12:
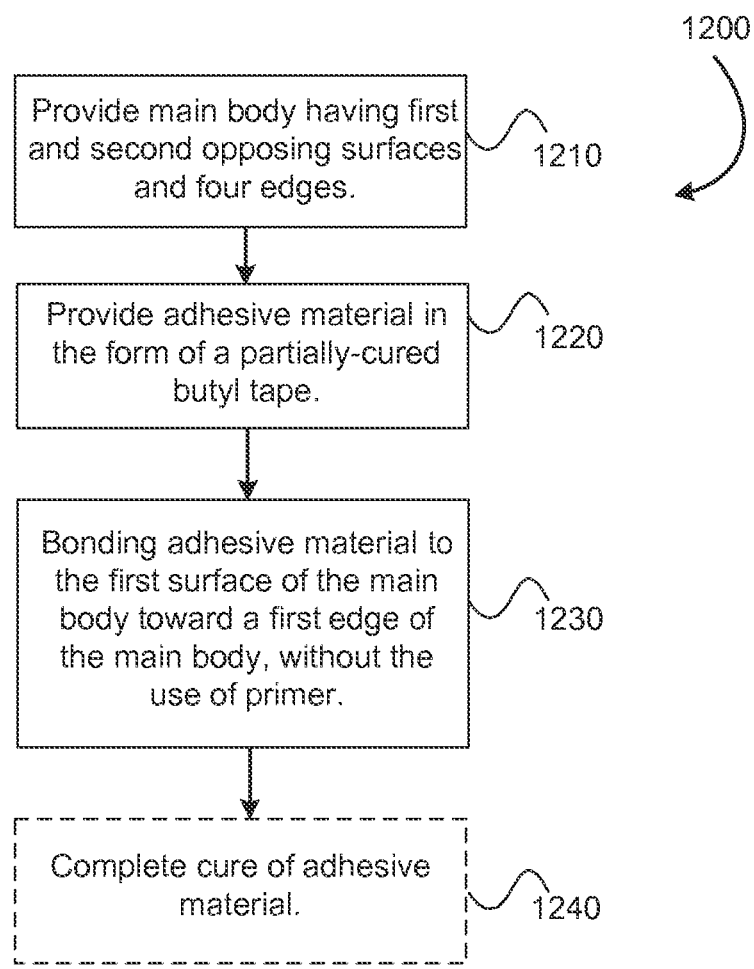
FIG. 12 illustrates a method of manufacturing a pre-taped roofing membrane, in accordance with embodiments of the invention.

FIG. 12 illustrates a method 1200 of manufacturing a pre-taped roofing membrane, in accordance with embodiments of the invention. In step 1210, a main body is provided, having first and second opposing surfaces and four edges. In step 1220, an adhesive material is provided in the form of a partially-cured butyl tape. In step 1230, the adhesive material is bonded to the main body toward a first edge of the main body. In optional step 1240, the cure of the adhesive material may be completed, for example by aging of the pre-taped roofing membrane or by heat treatment.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A roof membrane system atop a roof, comprising:
a first membrane positioned atop the roof, the first membrane having an edge, wherein the first membrane does not include any pre-applied adhesive material;
a second membrane positioned atop the roof, the second membrane having a first edge and a second edge opposite the first edge, wherein the first edge of the second membrane is overlapped with the edge of the first membrane, and the first edge of the second membrane includes a first pre-applied adhesive material on a surface thereof, above or below a main body of the second membrane, the first pre-applied adhesive material extending along a majority of the length of the first edge of the second membrane and adhering to the edge of the first membrane, and wherein the second edge of the second membrane includes a second pre-applied adhesive material on the same or an opposing surface of the second membrane, above or below a main body of the second membrane, the second pre-applied adhesive material extending along a majority of the length of the second edge of the second membrane; and
a third membrane positioned atop the roof, the third membrane having an edge, wherein the third membrane does not include any pre-applied adhesive material, and wherein the edge of the third membrane is overlapped with the second edge of the second membrane and is adhered to the second adhesive material.

2. The roof membrane system of claim 1, wherein the first and second pre-applied adhesive materials are on the same surface of the second membrane.

3. The roof membrane system of claim 1, wherein the first and second pre-applied adhesive materials are on opposing surfaces of the second membrane.

4. The roof membrane system of claim 1, comprising additional membranes lacking any pre-applied adhesive material and additional membranes having adhesive material pre-applied to opposing edges on the same surface, the roof membrane system substantially covering the roof with alternating membranes such that each proximate pair of membranes lacking pre-applied adhesive material is joined by a membrane having adhesive material pre-applied to two opposing edges on the same surface.

5. The roof membrane system of claim 1, wherein the first and second membranes are not all of the same width.

6. The roof membrane system of claim 1, wherein the second membranes are of reduced width as compared with the first membranes.

7. A membrane system for application to a roof, comprising:
a first membrane, the first membrane having an edge, wherein the first membrane does not include any pre-applied adhesive material;
a second membrane, the second membrane having a first edge and a second edge opposite the first edge, wherein the first edge of the second membrane is shaped and sized to be overlapped with the edge of the first membrane, and the first edge of the second membrane includes a first pre-applied adhesive material on a surface thereof, above or below a main body of the second membrane, the first pre-applied adhesive material extending along a majority of the length of the first edge of the second membrane and positioned to adhere to the edge of the first membrane, and wherein the second edge of the second membrane includes a second pre-applied adhesive material on the same or an opposing surface of the second membrane, above or below a main body of the second membrane, the second pre-applied adhesive material extending along a majority of the length of the second edge of the second membrane; and
a third membrane, the third membrane having an edge, wherein the third membrane does not include any pre-applied adhesive material, and wherein the edge of the third membrane is shaped and sized to be overlapped with the second edge of the second membrane and is adhered to the second adhesive material.

8. The membrane system of claim 7, wherein the first and second pre-applied adhesive materials are on the same surface of the second membrane.

9. The roof membrane system of claim 7, wherein the first and second pre-applied adhesive materials are on opposing surfaces of the second membrane.

10. The roof membrane system of claim 7, comprising additional membranes lacking any pre-applied adhesive material and additional membranes having adhesive material pre-applied to opposing edges on the same surface, the roof membrane system configured to substantially cover the roof with alternating membranes such that each proximate pair of membranes lacking pre-applied adhesive material is joined by a membrane having adhesive material pre-applied to two opposing edges on the same surface.

11. The roof membrane system of claim 7, wherein the first and second membranes are not all of the same width.

12. The roof membrane system of claim 7, wherein the second membranes are of reduced width as compared with the first membranes.

* * * * *